(12) United States Patent
Matsumoto (10) Patent No.: US 10,416,642 B2
(45) Date of Patent: Sep. 17, 2019

(54) PROGRAMMABLE CONTROLLER AND SYSTEM EQUIPPED WITH SAME

(71) Applicant: FANUC CORPORATION, Yamanashi (JP)

(72) Inventor: Akihiro Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/433,669

(22) Filed: Feb. 15, 2017

(65) Prior Publication Data

US 2018/0231947 A1    Aug. 16, 2018

(30) Foreign Application Priority Data

Feb. 25, 2016   (JP) ................................. 2016-034068

(51) Int. Cl.
*G05B 19/042*      (2006.01)
*G05B 19/05*       (2006.01)

(52) U.S. Cl.
CPC ....... *G05B 19/0426* (2013.01); *G05B 19/052* (2013.01); *G05B 2219/36023* (2013.01)

(58) Field of Classification Search
CPC ...... G05B 19/0426; G05B 2219/36023; G06F 3/03545; G06F 3/04845; G06Q 10/087
(Continued)

(56) References Cited

U.S. PATENT DOCUMENTS 4,926,375 A  *  5/1990  Mercer ................. H04L 12/28
                                                           370/432
6,470,223 B1   10/2002  Naganuma
(Continued)

FOREIGN PATENT DOCUMENTS

EP     0986006 A2    3/2000
JP   H05297902 A    11/1993
(Continued)

OTHER PUBLICATIONS

Japanese Office Action dated Mar. 13, 2018, for Japanese Patent Application No. 2016-034068.
(Continued)

*Primary Examiner* — Brian W Wathen
*Assistant Examiner* — Alicia M. Choi
(74) *Attorney, Agent, or Firm* — Karceski IP Law, PLLC (57) ABSTRACT

Provided is a PLC that can be connected to another PLC via a network, the PLC including: a storage unit that stores a sequence program; and a control unit, the control unit including: a sequence-program correcting unit that corrects the sequence program; a corrected-information obtaining unit that obtains a corrected portion and a corrected content from the corrected sequence program; a corresponding-circuit inquiring unit that extracts a first circuit in the vicinity of the corrected portion from the sequence program before correction and that makes an inquiry to the other PLC about whether a circuit corresponding to the first circuit is included in a sequence program of the other PLC; and a corrected-content transmitting unit that transmits, in response to the inquiry, the corrected content to the other PLC only when a reply indicating that the circuit corresponding to the first circuit is included is received from the other PLC.

11 Claims, 11 Drawing Sheets

(58) Field of Classification Search
USPC .......................................................... 700/20
See application file for complete search history.

(56) References Cited

U.S. PATENT DOCUMENTS

| | | | | |
|---|---|---|---|---|
| 2003/0177440 A1* | 9/2003 | Kegoya | ................ | G05B 19/042 |
| | | | | 715/273 |
| 2004/0107272 A1* | 6/2004 | Manukyan | .......... | G06F 9/44505 |
| | | | | 709/221 |
| 2007/0055388 A1 | 3/2007 | Araki et al. | | |
| 2012/0190358 A1* | 7/2012 | Aminaka | .............. | H04W 24/02 |
| | | | | 455/422.1 |
| 2013/0325145 A1* | 12/2013 | Schultze | ................ | G05B 19/02 |
| | | | | 700/2 |
| 2015/0094829 A1* | 4/2015 | Iwatsu | ................. | G05B 19/056 |
| | | | | 700/86 |
| 2015/0277415 A1* | 10/2015 | Senda | .................... | G05B 19/05 |
| 2016/0034259 A1* | 2/2016 | Yamaoka | ................. | G06F 8/36 |
| | | | | 717/107 |

FOREIGN PATENT DOCUMENTS

| | | | | |
|---|---|---|---|---|
| JP | H05-061509 A | * 12/1993 | ............. | G05B 19/05 |
| JP | H07319515 | 12/1995 | | |
| JP | 2000090057 A | 3/2000 | | |
| JP | 2004062394 | 2/2004 | | |
| JP | 2004126817 A | 4/2004 | | |
| JP | 2005346409 | 12/2005 | | |
| JP | 4722613 B | 2/2007 | | |
| JP | 2007041761 A | * 2/2007 | ............. | G05B 19/05 |
| JP | 4722613 B2 | 7/2011 | | |
| JP | 2012099064 A | 5/2012 | | |
| JP | 2015162179 A | * 9/2015 | ............. | G05B 19/05 |

OTHER PUBLICATIONS

Japanese Search Report by Registered Searching Authority, submitted to the JPO dated Feb. 21, 2018, for Japanese Patent Application No. 2016-034068.

* cited by examiner

SEQUENCE PROGRAM #1 AFTER CORRECTION

FIG. 4B

SEQUENCE PROGRAM #1 BEFORE CORRECTION

LADDER CIRCUIT IN VICINITY OF CORRECTED PORTION

FIG. 10 ated Patent Application, Publication No. H5-297902 ("JP '902") is known, for example. JP '902 discloses that a program maintenance tool connected to a plurality of programmable controllers via a transmission line has a multiplexing determination function for determining whether a specified programmable controller is multiplexed with other programmable controllers, and transfer of a sequence program to the respective multiplexed programmable controllers is collectively performed through a single operation.

PROGRAMMABLE CONTROLLER AND SYSTEM EQUIPPED WITH SAME

CROSS-REFERENCE TO RELATED APPLICATIONS

This application is based on and claims priority to Japanese Patent Application No. 2016-034068, filed on Feb. 25, 2016, the content of which is incorporated herein by reference.

FIELD OF THE INVENTION

The present invention relates to a programmable controller that can be connected to another programmable controller via a communication network and to a system equipped with the same.

BACKGROUND OF THE INVENTION

In general, in factories where machining or assembly is performed, a programmable controller is used to control a machining cell, which is a unit formed by combining a machine tool, an industrial robot, etc. Furthermore, the entire production system is often composed of a plurality of programmable controllers, though it depends on the system scale, and the programmable controller for each machining cell is interconnected to the other programmable controllers via a communication network, such as Ethernet (registered trademark) or FL-NET, thereby performing communication among the programmable controllers.

When the processing performed in respective machining cells is the same, as a method of transferring a sequence program to the programmable controllers interconnected as described above, the method disclosed in Japanese Unexamined Patent Application, Publication No. H5-297902 ("JP '902") is known, for example. JP '902 discloses that a program maintenance tool connected to a plurality of programmable controllers via a transmission line has a multiplexing determination function for determining whether a specified programmable controller is multiplexed with other programmable controllers, and transfer of a sequence program to the respective multiplexed programmable controllers is collectively performed through a single operation.

SUMMARY OF THE INVENTION

The present invention provides the following solutions.

According to a first aspect, the present invention provides a programmable controller that can be connected to another programmable controller via a communication network, including: a storage unit that stores a sequence program; and a control unit, wherein the control unit includes: a sequence-program correcting unit that corrects the sequence program; a corrected-information obtaining unit that obtains a corrected portion and a corrected content from the corrected sequence program; a corresponding-circuit inquiring unit that extracts a first circuit in the vicinity of the corrected portion from the sequence program before correction and that makes an inquiry to the other programmable controller about whether a circuit corresponding to the first circuit is included in a sequence program of the other programmable controller; and a corrected-content transmitting unit that transmits, in response to the inquiry from the corresponding-circuit inquiring unit, the corrected content to the other programmable controller only when a reply indicating that the circuit corresponding to the first circuit is included is received from the other programmable controller.

According to a second aspect, the present invention provides a system that is provided with the above-described plurality of programmable controllers interconnected via the communication network and that corrects sequence programs.

According to a third aspect, the present invention provides a programmable controller that can be connected to another programmable controller and to a controller that controls the programmable controllers, via a communication network, including: a storage unit that stores a sequence program; and a control unit, wherein the control unit includes: a sequence-program correcting unit that corrects the sequence program; a corrected-information obtaining unit that obtains a corrected portion and a corrected content from the corrected sequence program; a corresponding-circuit inquiring unit that extracts a circuit in the vicinity of the corrected portion from the sequence program before correction and that makes an inquiry to the controller about whether a circuit corresponding to the circuit is included in a sequence program of the other programmable controller; and a corrected-content transmitting unit that transmits, in response to the inquiry from the corresponding-circuit inquiring unit, the corrected content to the other programmable controller only when a reply indicating that the circuit corresponding to the circuit is included is received from the controller.

According to a fourth aspect, the present invention provides a system that corrects sequence programs, including: the above-described plurality of programmable controllers interconnected via the communication network; and a controller that is connected to the programmable controllers via the communication network and that controls the programmable controllers, wherein the controller includes: a sequence-program requesting unit that receives the inquiry from one programmable controller of the programmable controllers and that requests the other programmable controller to transmit a copy of the sequence program; and a response unit that searches the copy of the sequence program for a circuit corresponding to the circuit and that replies, to the one programmable controller and the other programmable controller, about whether the circuit corresponding to the circuit is included in the copy of the sequence program.

DESCRIPTION OF EMBODIMENTS

A programmable controller (hereinafter, referred to as PLC (Programmable Logic Controller)) and a system equipped with the same according to one embodiment of the present invention will be described below with reference to the drawings.

Figure 1:
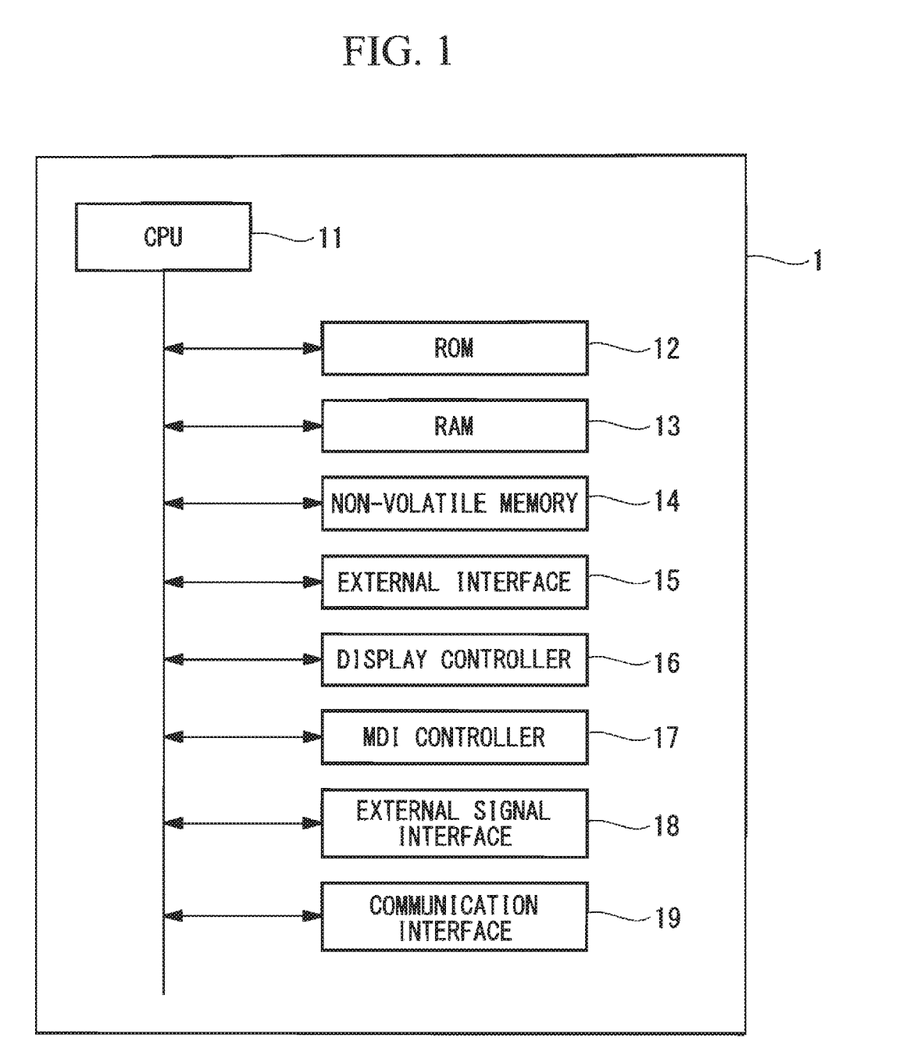
FIG. 1 is a block diagram showing, in outline, the configuration of a programmable controller according to one embodiment of the present invention.

FIG. 1 is a block diagram showing, in outline, the configuration of a PLC 1 of this embodiment. As shown in FIG. 1, the PLC 1 is configured by including: a CPU (Central Processing Unit) (control unit) 11; a ROM (Read Only Memory) 12 and a RAM (Random Access Memory) (storage unit) 13 that serve as a main storage; a non-volatile memory 14 that serves as an auxiliary storage; an external interface 15; a display controller 16; an MDI (Manual Data Input) controller 17; an external signal interface 18; and a communication interface 19. The RAM 13 stores a sequence program, and the CPU 11 reads and executes instructions of the sequence program stored in the RAM 13, thereby realizing various types of processing.

First Embodiment

Figure 2:
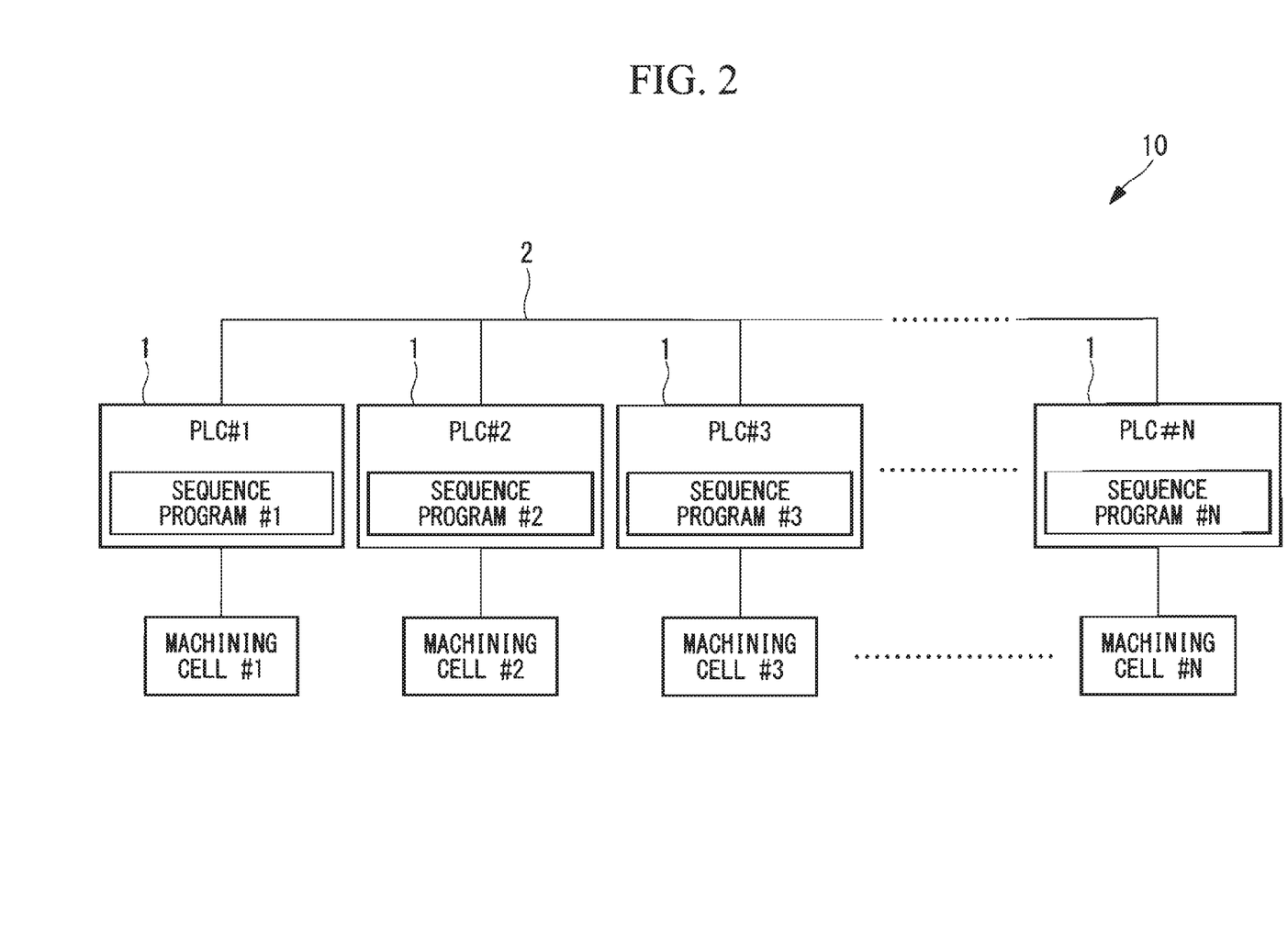
FIG. 2 is a block diagram showing, in outline, the configuration of a system according to a first embodiment of the present invention.

FIG. 2 is a block diagram showing, in outline, the configuration of a system 10 according to a first embodiment of the present invention. As shown in FIG. 2, the system 10 is provided with a plurality of PLCs 1 indicated by PLCs #1 to #N corresponding to machining cells #1 to #N that are formed of machine tools, industrial robots, etc. Sequence programs #1 to #N stored in the RAMs 13 of the PLCs #1 to #N are respectively executed, thereby respectively controlling the machining cells #1 to #N. Furthermore, the PLCs #1 to #N are interconnected via a communication network, such as Ethernet (registered trademark) or FL-NET, thereby exchanging various data between the PLCs 1.

Note that FIG. 2 shows, for explanation, an example case in which there are N pairs of machining cells and PLCs 1, where N≥4; however, the number of pairs is not limited thereto, and it is merely necessary to provide at least a plurality of pairs of machining cells and PLCs 1.

Figure 3:
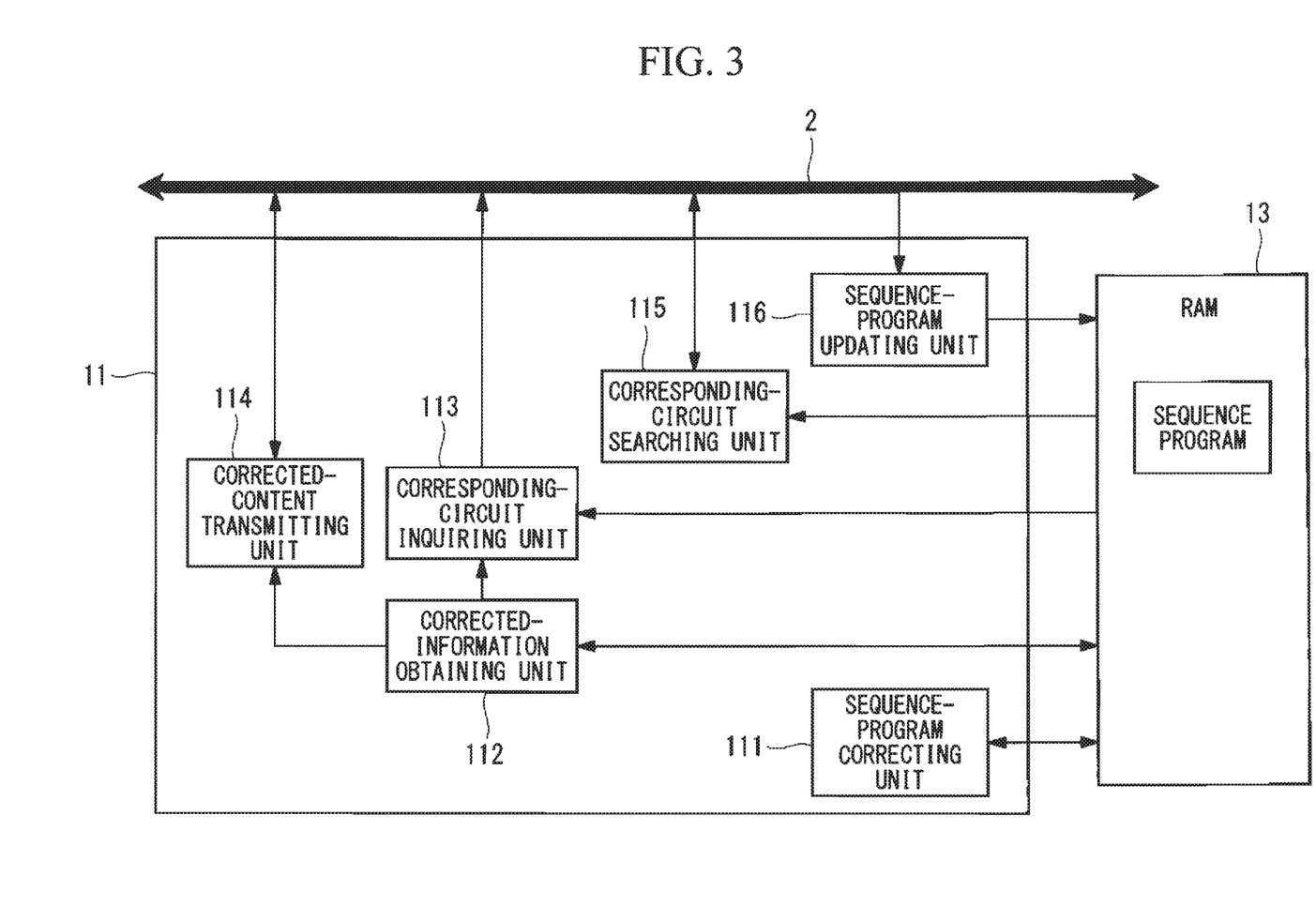
FIG. 3 is a view for explaining a functional block of the programmable controller provided in the system shown in FIG. 2.

FIG. 3 is a view for explaining a functional block of the PLC 1. As shown in FIG. 3, the CPU 11 of the PLC 1 is provided with: a sequence-program correcting unit 111 that corrects the sequence program in the RAM 13; a corrected-information obtaining unit 112 that obtains a corrected portion and corrected content of the sequence program on the basis of the sequence programs before and after correction; a corresponding-circuit inquiring unit 113 that extracts a ladder circuit in the vicinity of the corrected portion from the sequence program before correction and that makes an inquiry to the other PLCs 1, which are connected via a communication network 2, about whether a ladder circuit corresponding to the extracted ladder circuit is included in the sequence programs of the other PLCs 1; a corrected-content transmitting unit 114 that transmits the corrected content to the other PLCs 1; a corresponding-circuit searching unit 115 that makes a search as to whether a ladder circuit about which another PLC 1 has made an inquiry is included in the sequence program and that transmits the search result to the other PLC 1; and a sequence-program updating unit 116 that updates the sequence program stored in the RAM 13 in response to a request from another PLC 1.

The operation of the thus-configured PLC 1 and system 10 of this embodiment will be described below. In this embodiment, a procedure in which, when the sequence program #1 of the PLC #1, shown in FIG. 2, is corrected, the sequence programs #2 to #N of the other PLCs #2 to #N are automatically updated will be described with reference to the block diagram in FIG. 3 and the flowcharts in FIGS. 5 and 6.

Figure 4A:
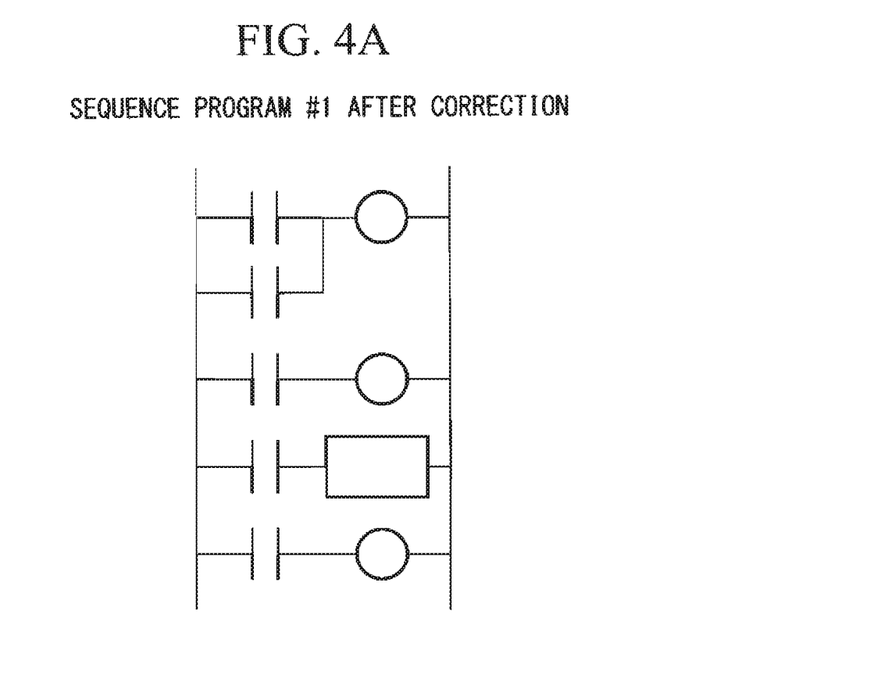
FIG. 4A shows an example sequence program and is a view showing the sequence program after correction.
Figure 5:
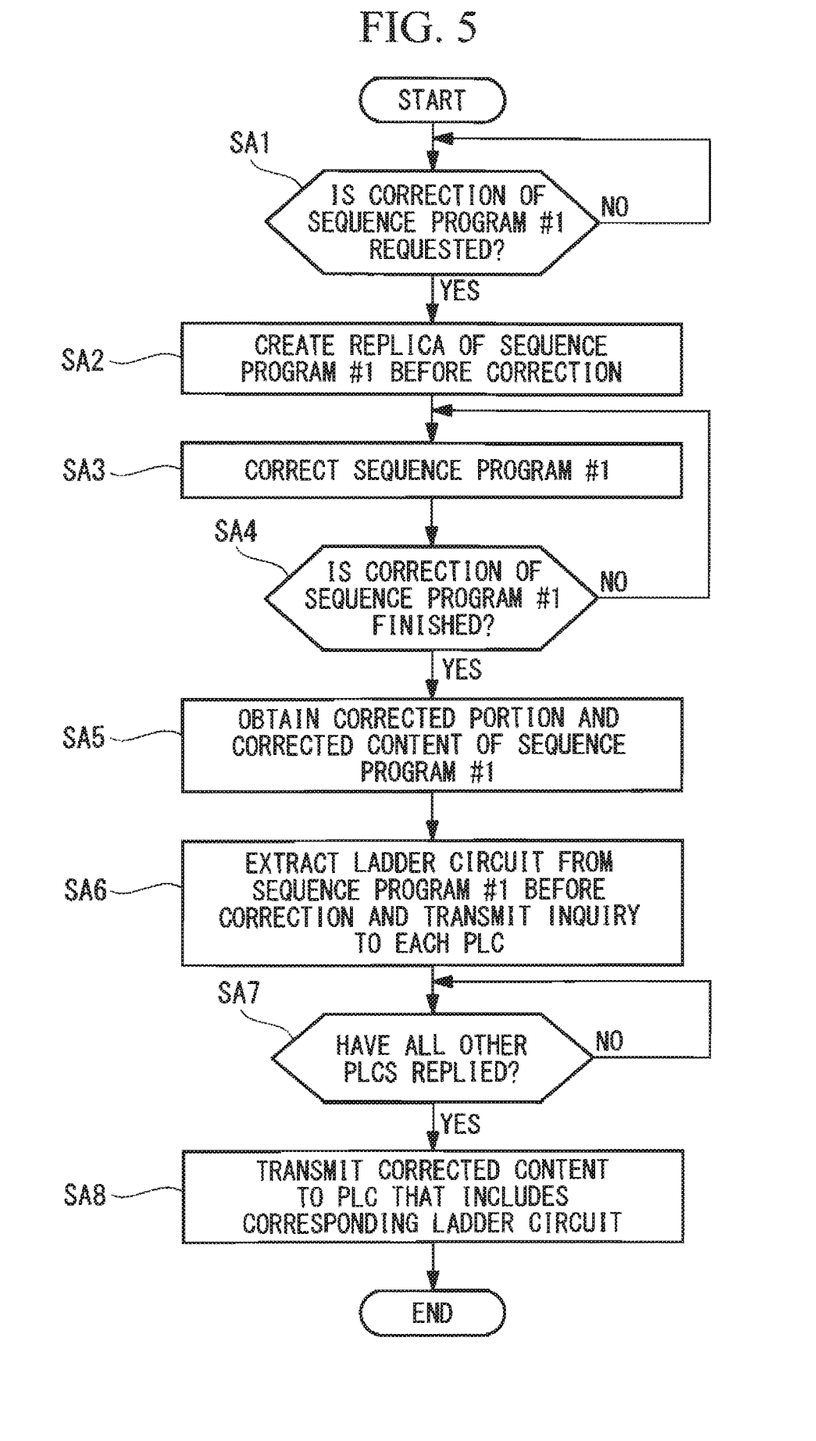
FIG. 5 is a flowchart showing a procedure in a programmable controller that is provided in the system shown in FIG. 2 and that corrects a sequence program.

In the initial state, the PLC #1 waits until a correction request for the sequence program #1 is received from the outside (Step SA1 of FIG. 5). On receiving the correction request, a replica of the sequence program #1 before correction is created in the RAM 13 (Step SA2 of FIG. 5). Then, the sequence program #1 is corrected (Step SA3 of FIG. 5). In this embodiment, for the sake of simplicity, for example, as shown in FIG. 4A, it is assumed that correction is performed such that a contact arranged on the top rung forms a logical OR (OR) circuit.

When the correction of the sequence program #1 is finished (Step SA4 of FIG. 5), the corrected-information obtaining unit 112 obtains the corrected portion and the corrected content of the sequence program #1 (Step SA5 of FIG. 5). The corrected portion and the corrected content may be obtained by comparing the sequence program #1 before correction which is replicated and stored in the RAM 13 with the sequence program #1 after correction, for example.

Next, in the corresponding-circuit inquiring unit 113, a ladder circuit (first circuit) in the vicinity of the corrected portion is extracted from the sequence program #1 before correction, on the basis of the corrected portion obtained in the corrected-information obtaining unit 112 and the sequence program #1 before correction stored in the RAM 13, and an inquiry is made to the other PLCs #2 to #N about whether a ladder circuit corresponding to this ladder circuit is included in the sequence programs of the other PLCs #2 to #N (Step SA6 of FIG. 5).

Then, the PLC #1 enters a standby state until it receives replies to the inquiry from all the PLCs #2 to #N (Step SA7 of FIG. 5).

Figure 4B:
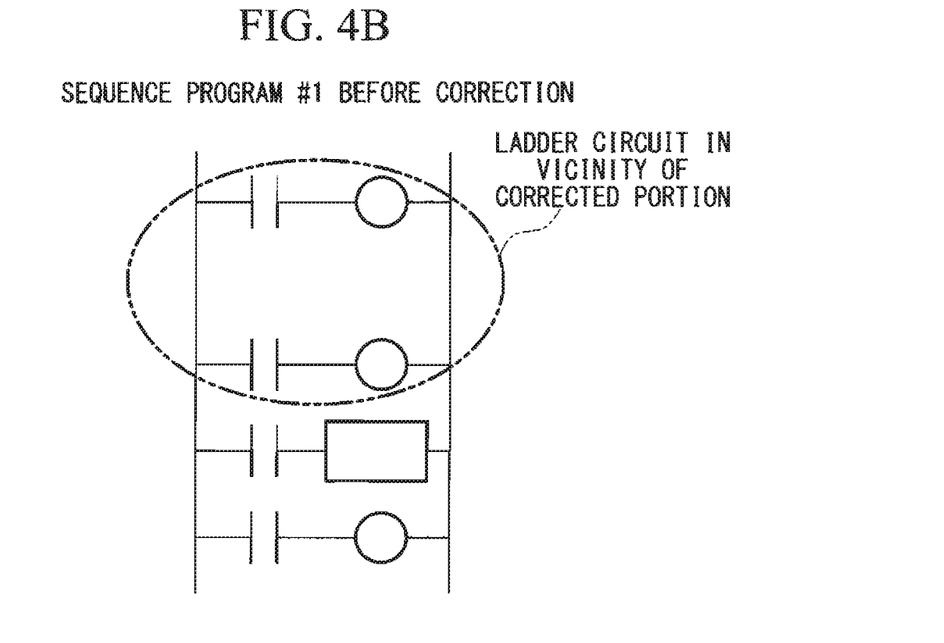
FIG. 4B shows an example sequence program and is a view showing the sequence program before correction.

In this embodiment, two rung portions including the corrected portion are set as a ladder circuit in the vicinity of the corrected portion, as shown in FIG. 4B; however, the range is not limited thereto and can be changed according to which range of a ladder circuit in the sequence program is updated.

Furthermore, when the sequence program is composed of a plurality of programs, the program name of a corrected program may be extracted instead of extracting a ladder circuit in the vicinity of the corrected portion, and an inquiry may be made to the other PLCs #2 to #N about whether a program having this program name is included in the sequence programs of the other PLCs #2 to #N.

Figure 6:
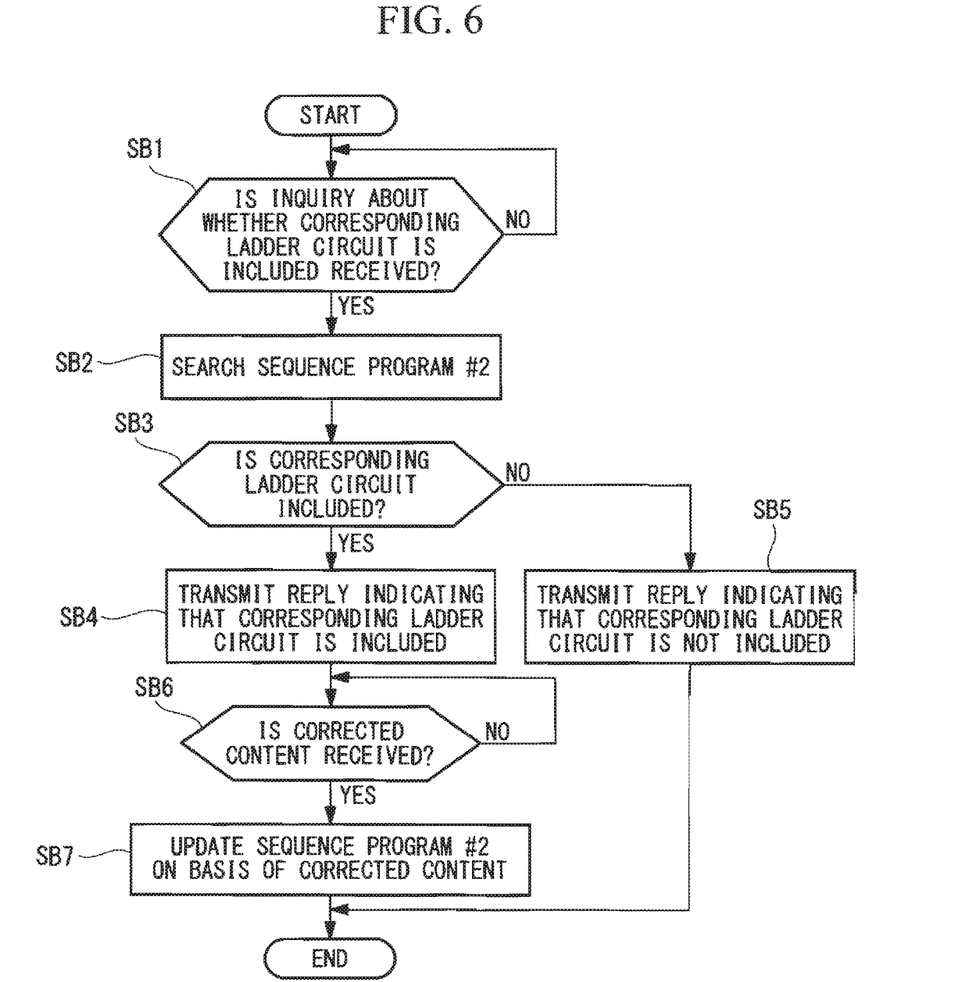
FIG. 6 is a flowchart showing a procedure in a programmable controller that is provided in the system shown in FIG. 2 and that updates a sequence program.

On receiving the above-described inquiry from the PLC #1 via the communication network 2, the PLC #2 releases the standby state (Step SB1 of FIG. 6), and, in the corresponding-circuit searching unit 115, the inside of the sequence program #2 stored in the PLC #2 is searched (Step SB2 of FIG. 6), and it is determined whether a ladder circuit corresponding to the ladder circuit (second circuit) about which the PLC #1 has made an inquiry is included therein (Step SB3 of FIG. 6).

In the corresponding-circuit searching unit 115, in principle, when all elements constituting the ladder circuit extracted from the sequence program #1 are the same as those of a ladder circuit included in the sequence program #2, it is determined that the sequence program #2 includes a ladder circuit corresponding to the sequence program #1; however, the present invention is not limited thereto, and, when some of the elements constituting the ladder circuit extracted from the sequence program #1 are the same as part of the sequence program #2, it may be determined that a corresponding ladder circuit is included in the sequence program #2.

Furthermore, in the sequence program composed of a plurality of programs, if the above-described inquiry is an inquiry about whether a program having the specified program name is included, it is determined that a corresponding ladder circuit is included in the sequence program #2 when a program having the same program name as the specified program name exists in the sequence program #2.

In the corresponding-circuit searching unit 115, when it is determined that a ladder circuit corresponding to the ladder circuit about which the PLC #1 has made an inquiry is included, the PLC #2 transmits, to the PLC #1, a reply indicating that the corresponding ladder circuit is included (Step SB4 of FIG. 6) and enters the standby state until the corrected content is transmitted from the PLC #1 (Step SB6 of FIG. 6). On the other hand, if it is determined that a corresponding ladder circuit is not included, the PLC #2 transmits, to the PLC #1, a reply indicating that a corresponding ladder circuit is not included (Step SB5 of FIG. 6) and ends the processing.

Although not shown in the figure, the PLCs #3 to #N, which also receive the inquiry from the PLC #1, similarly search, with the corresponding-circuit searching unit 115, the sequence programs #3 to #N stored in the PLCs #3 to #N, and determine whether a ladder circuit corresponding to the ladder circuit about which the PLC #1 has made the inquiry is included. Then, in the corresponding-circuit searching unit 115, if it is determined that a ladder circuit corresponding to the ladder circuit about which the PLC #1 has made the inquiry is included, the PLCs #3 to #N transmit, to the PLC #1, replies each indicating that the corresponding ladder circuit is included and enter the standby state until the corrected content is transmitted from the PLC #1. On the other hand, if it is determined that a corresponding ladder circuit is not included, the PLCs #3 to #N transmit, to the PLC #1, replies each indicating that a corresponding circuit is not included (Step SB5 of FIG. 6) and end the processing.

Next, upon receiving the replies to the inquiry from all the other PLCs #2 to #N, the PLC #1 that has been in the standby state releases the standby state (Step SA7 of FIG. 5), and, in the corrected-content transmitting unit 114, the corrected content obtained in the corrected-information obtaining unit 112 is transmitted only to a PLC that has replied that the corresponding circuit was included, among the PLCs #2 to #N (Step SA8 of FIG. 5).

Upon receiving the corrected content from the PLC #1, the PLC that has been in the standby state, among the PLCs #2 to #N, updates, in the sequence-program updating unit 116, the corresponding circuit on the basis of the received corrected content (Step SB7 of FIG. 6).

In this way, in this embodiment, the PLC #1 that has corrected the ladder circuit that is part of the sequence program #1 makes an inquiry to the other PLCs #2 to #N about whether a ladder circuit corresponding to the ladder circuit that is part of the sequence program #1 is included and transmits the corrected content only to a PLC that has a circuit corresponding to the ladder circuit that is part of the sequence program #1.

Accordingly, when a ladder circuit that is part of the sequence program of one PLC 1 is corrected in the plurality of PLCs 1 connected via the communication network, a ladder circuit that is part of a sequence program of another PLC 1, corresponding thereto, can also be automatically corrected. Thus, because it is not necessary to individually correct the sequence program for each PLC, the time required to correct the sequence programs can be significantly reduced. Furthermore, which portions of which PLCs include a common ladder circuit need not be managed, thus improving the maintainability when the sequence programs are corrected.

Second Embodiment

Next, a system 20 according to a second embodiment of the present invention will be described with reference to FIGS. 7 to 11. Note that, in FIGS. 7 and 8, identical signs are assigned to the same portions as those in the configuration of the first embodiment, shown in FIGS. 2 and 3, and a detailed description thereof will be omitted.

Figure 7:
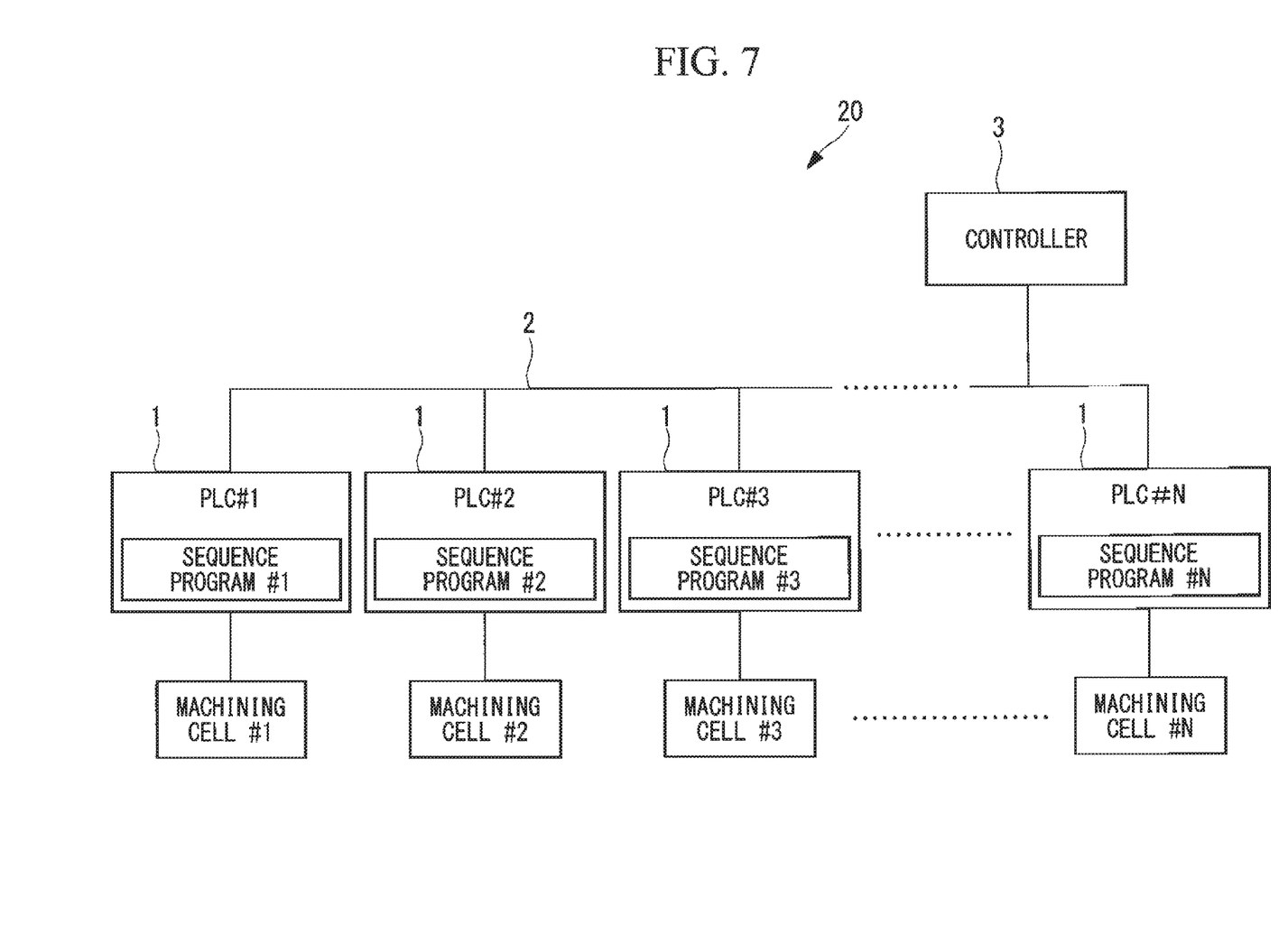
FIG. 7 is a block diagram showing, in outline, the configuration of a system according to a second embodiment of the present invention.

FIG. 7 is a block diagram showing, in outline, the configuration of the system 20. As shown in FIG. 7, the system 20 differs from the first embodiment in that a controller 3 that controls a plurality of PLCs 1 indicated by PLCs #1 to #N is connected to the PLCs #1 to #N via the communication network 2.

Note that the controller 3 may be a personal computer or dedicated control equipment.

Figure 8:
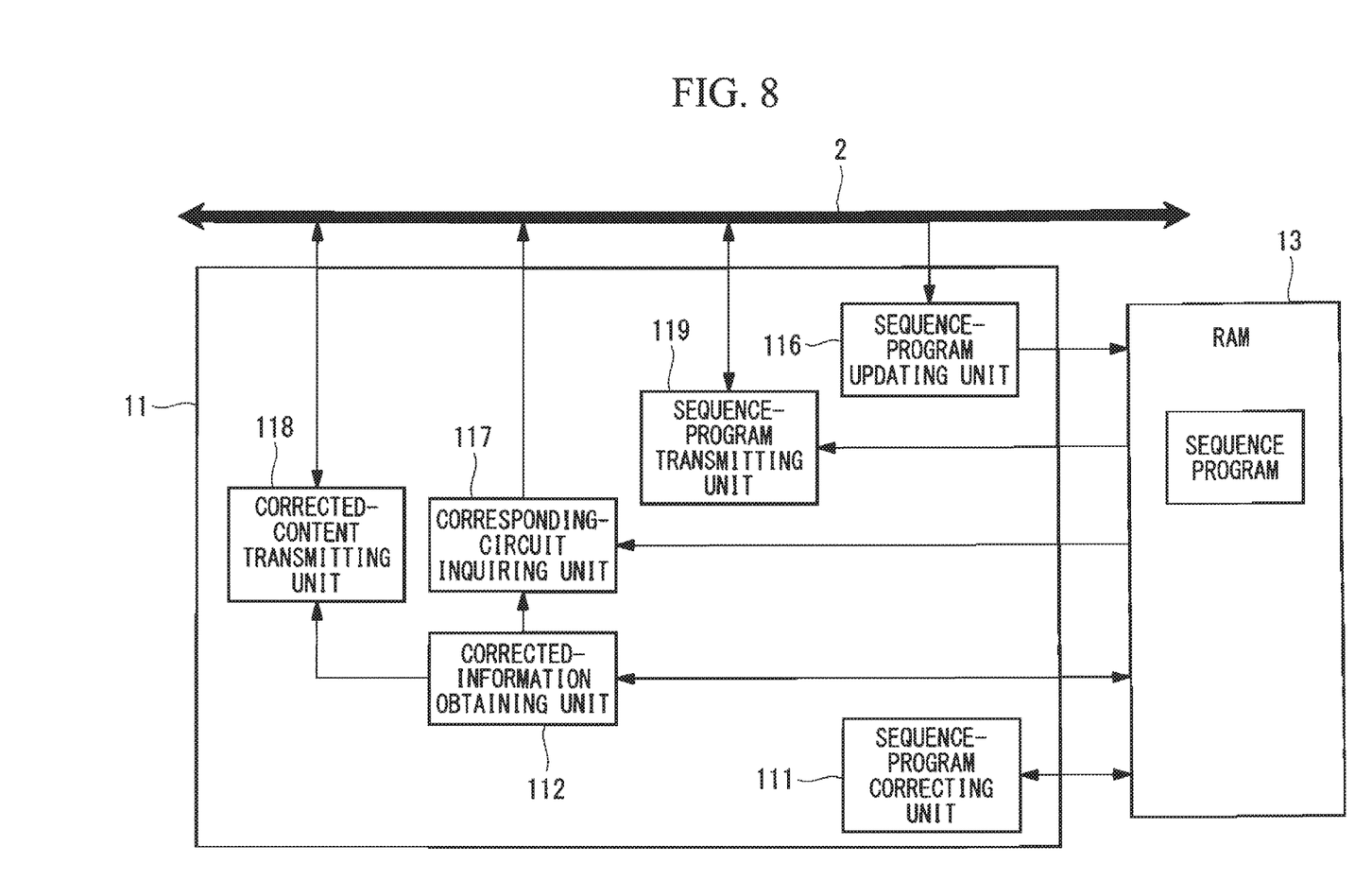
FIG. 8 is a functional block diagram of a programmable controller that is provided in the system shown in FIG. 7.

FIG. 8 is a view for explaining the functional block of the PLC 1. As shown in FIG. 8, the CPU 11 of this embodiment is provided with: the sequence-program correcting unit 111, which corrects the sequence program stored in the RAM 13; the corrected-information obtaining unit 112, which obtains the corrected portion and the corrected content of the sequence program on the basis of the sequence programs before and after correction; a corresponding-circuit inquiring unit 117 that extracts a ladder circuit in the vicinity of the corrected portion from the sequence program before correction and that makes an inquiry to the controller 3, which is connected via the communication network 2, about whether a ladder circuit corresponding thereto is included in the sequence programs of the other PLCs 1; a corrected-content transmitting unit 118 that transmits the corrected content to another PLC 1; a sequence-program transmitting unit 119; and the sequence-program updating unit 116, which updates the sequence program stored in the RAM 13 in response to a request from another PLC 1.

Furthermore, although not shown in the figure, the controller 3 is provided with: a sequence-program requesting unit that receives the above-described inquiry from one PLC 1 and that requests the other PLCs 1 to transmit copies of the sequence programs; and a response unit that makes a search as to whether a ladder circuit corresponding to the ladder circuit extracted from the sequence program of the one PLC 1 is included in the received copies of the sequence programs of the other PLCs 1, and that transmits the results to the one PLC 1 and the other PLCs 1.

The operation of the thus-configured PLC 1 of this embodiment, and system 20 equipped with the same, will be described below. In this embodiment, a procedure in which, when the sequence program #1 of the PLC #1 is corrected, the sequence programs #2 to #N of the other PLCs #2 to #N are automatically updated will be described with reference to the block diagram in FIG. 8 and the flowcharts in FIGS. 9 to 11.

Figure 9:
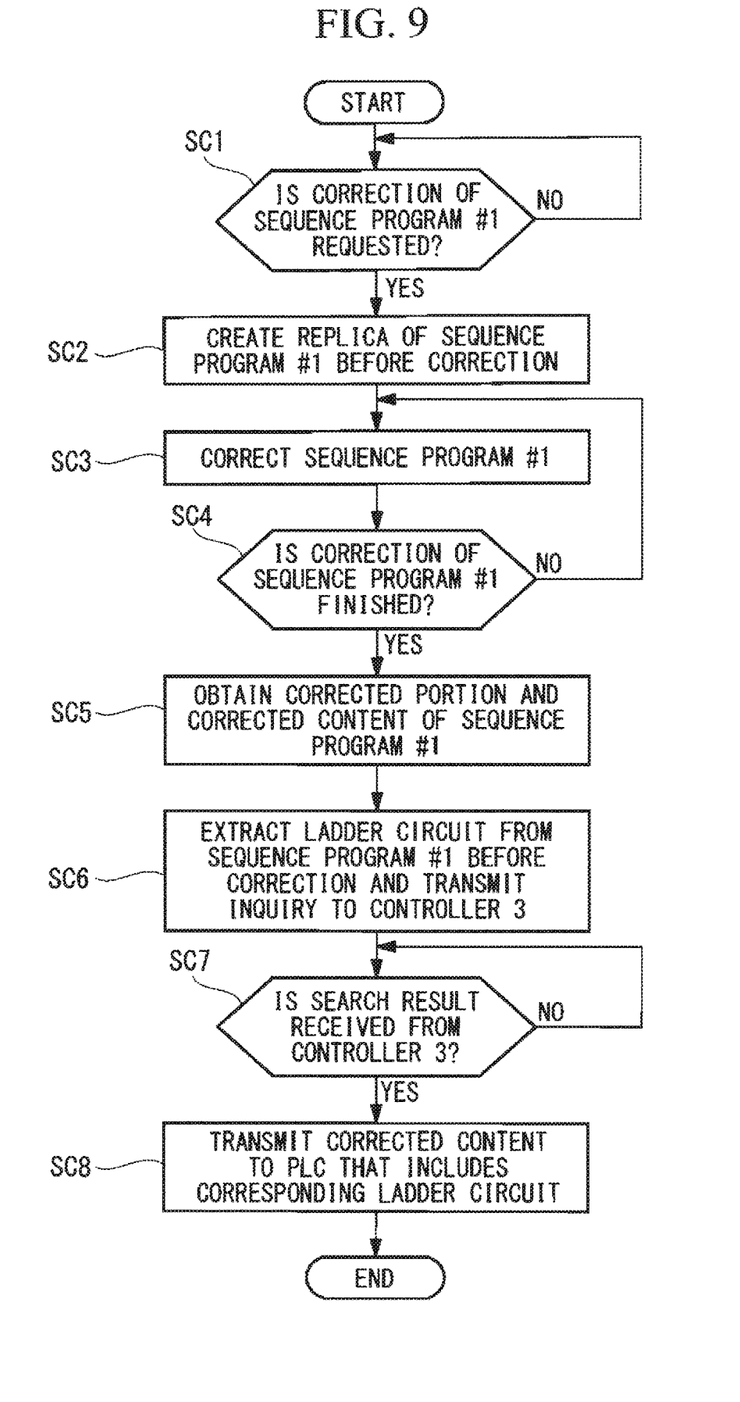
FIG. 9 is a flowchart showing a procedure in a programmable controller that is provided in the system shown in FIG. 7 and that corrects a sequence program.

As in the first embodiment, Steps SC1 to SC5 in FIG. 9 are procedures performed in the sequence-program correcting unit 111 and the corrected-information obtaining unit 112 and are the same as Steps SA1 to SA5 in FIG. 5, and thus, a description thereof will be omitted.

Following Step SC5, in the corresponding-circuit inquiring unit 117, a ladder circuit in the vicinity of the corrected portion is extracted from the sequence program #1 before correction on the basis of the corrected portion obtained in the corrected-information obtaining unit 112 and the sequence program #1 before correction stored in the RAM 13, and an inquiry is made to the controller 3, which controls the PLCs 1, about whether a ladder circuit corresponding to the extracted ladder circuit is included in the sequence programs of the PLCs 1 where the sequence programs have not been corrected, i.e., the PLCs #2 to #N other than the PLC #1 (Step SC6 in FIG. 9). Then, the PLC #1 enters the standby state until a search result serving as a reply to the inquiry is received from the controller 3 (Step SC7 in FIG. 9).

Figure 10:
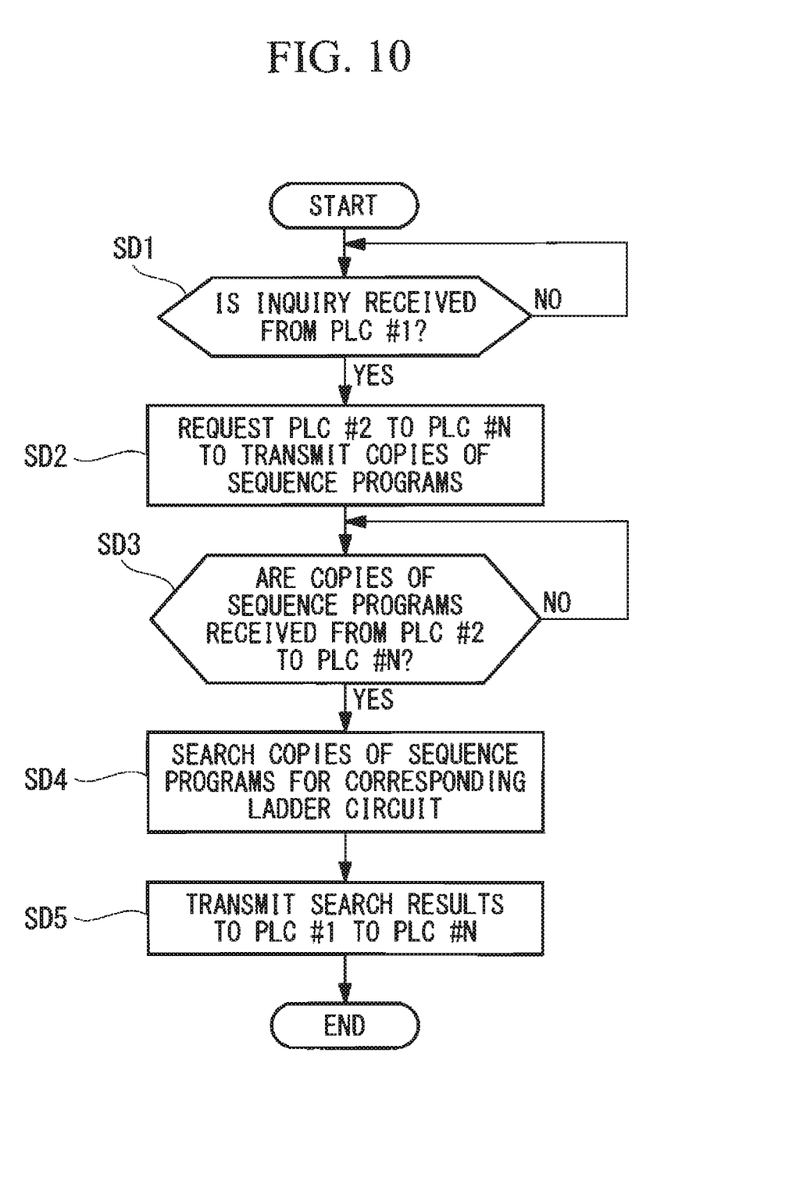
FIG. 10 is a flowchart showing a procedure in a controller that is provided in the system shown in FIG. 7 and that controls programmable controllers.

Upon receiving the inquiry from the PLC #1 where the sequence program has been corrected (Step SD1 of FIG. 10), the controller 3 releases the standby state, and the sequence-program requesting unit requests the PLCs in which the sequence programs have not been corrected, i.e., PLCs #2 to #N, to transmit copies of the sequence programs of the PLCs (Step SD2 in FIG. 10).

Figure 11:
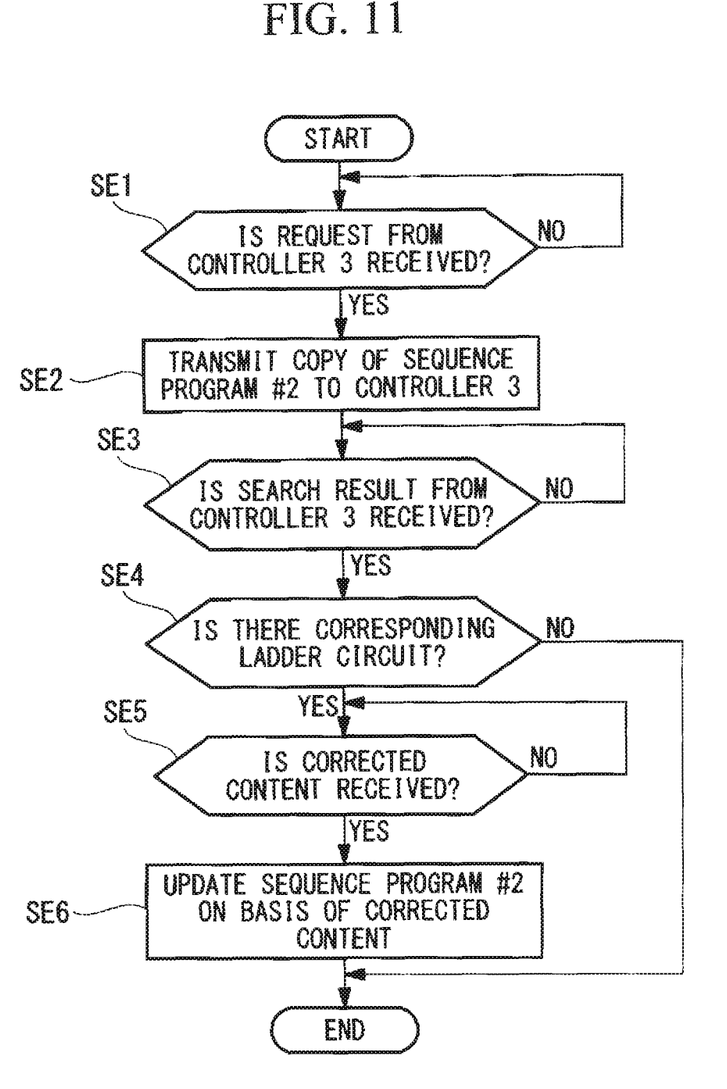
FIG. 11 is a flowchart showing a procedure in a programmable controller that is provided in the system shown in FIG. 7 and that updates a sequence program.

When the PLC #2 receives the above-described request from the controller 3 (Step SE1 of FIG. 11), the sequence-program transmitting unit 119 transmits a copy of the sequence program #2 to the controller 3 (Step SE2 of FIG. 11). The PLC #2 enters the standby state until the search result is received from the controller 3 (Step SE3 of FIG. 11).

Although not shown in the figure, the PLCs #3 to #N, which also receive the above-described request from the controller 3, similarly transmit, with the sequence-program transmitting unit 119, copies of the sequence programs #3 to #N to the controller 3 and enter the standby state until the search result is received (Step SE3 of FIG. 11).

When the copies of the sequence programs #2 to #N are received from all the PLCs #2 to #N requested to transmit the copies of the sequence programs (Step SD3 of FIG. 10), the controller 3 releases the standby state, searches the received copies of the sequence programs #2 to #N, and determines whether a ladder circuit corresponding to the ladder circuit extracted from the sequence program #1 is included therein (Step SD4 of FIG. 10).

Then, the controller 3 transmits, in the response unit, search results each indicating whether a ladder circuit corresponding to the ladder circuit extracted from the sequence program #1 is included to the PLCs #1 to #N (Step SD5 of FIG. 10) and ends the processing.

Upon receiving the search result from the controller 3, the PLC #1 that has been in the standby state releases the standby state and transmits, in the corrected-content transmitting unit 118, the corrected content obtained in the corrected-information obtaining unit 112 only to a PLC that includes a ladder circuit corresponding to the ladder circuit extracted from the sequence program #1 (Step SC8 of FIG. 9).

The PLCs #2 to #N that have been in the standby state release the standby state upon receiving the search results from the controller 3, and check the search results to see if a ladder circuit corresponding to the ladder circuit extracted from the sequence program #1 is included. The PLC 1 that has the sequence program including no ladder circuit corresponding to the ladder circuit ends the processing and enters the standby state until a request from the controller 3 is received again (Step SE4 of FIG. 11). The PLC 1 that has the sequence program including a ladder circuit corresponding to the ladder circuit enters the standby state until the corrected content from the PLC #1 is received (Step SE5 of FIG. 11), releases the standby state upon receiving the corrected content from the PLC #1, and updates, in the sequence-program updating unit 116, the corresponding circuit on the basis of the received corrected content (Step SE6 of FIG. 11).

In this way, in this embodiment, the PLC #1 that has corrected a ladder circuit that is part of the sequence program #1 makes an inquiry to the controller 3, which controls the plurality of PLCs, about whether the sequence programs #2 to #N of the PLCs #2 to #N have a ladder circuit corresponding to the ladder circuit that is part of the sequence program #1. On receiving the inquiry, the controller 3 searches copies of the sequence programs #2 to #N of the PLCs #2 to #N for a ladder circuit corresponding to the above-described part ladder circuit and transmits the search results to the PLCs #1 to #N. Then, the PLC #1 transmits the corrected content only to a PLC that has a ladder circuit corresponding to the ladder circuit that is part of the sequence program #1, on the basis of the search results.

Accordingly, when a ladder circuit that is part of the sequence program of one PLC 1 is corrected in the plurality of PLCs 1 connected via the communication network, a ladder circuit that is part of a sequence program of another PLC 1, corresponding thereto, can also be automatically corrected. Thus, because it is not necessary to individually correct the sequence program for each PLC, the time required to correct the sequence programs can be significantly reduced. Furthermore, which portions of which PLCs include a common ladder circuit need not be managed, thus improving the maintainability when the sequence programs are corrected. Furthermore, since the controller 3 performs processing for extracting the corresponding circuit, it is possible to reduce the amounts of processing performed in the PLCs, compared with the PLCs of the first embodiment, thus making it possible to suppress the loads of the CPUs of the programmable controllers.

The embodiments of the present invention have been described in detail with reference to the drawings; however, specific configurations are not limited to those embodiments, and design changes etc. that do not depart from the scope of the present invention are also encompassed.

For example, the sequence program in the above-described embodiments is described in the form of the ladder circuit; however, the sequence program is not limited thereto and can be described with an FBD (function block diagram) or the like.

As a result, the above-described embodiments lead to the following aspects.

According to a first aspect, the present invention provides a programmable controller that can be connected to another programmable controller via a communication network, including: a storage unit that stores a sequence program; and a control unit, wherein the control unit includes: a sequence-program correcting unit that corrects the sequence program; a corrected-information obtaining unit that obtains a corrected portion and a corrected content from the corrected sequence program; a corresponding-circuit inquiring unit that extracts a first circuit in the vicinity of the corrected portion from the sequence program before correction and that makes an inquiry to the other programmable controller about whether a circuit corresponding to the first circuit is included in a sequence program of the other programmable controller; and a corrected-content transmitting unit that transmits, in response to the inquiry from the corresponding-circuit inquiring unit, the corrected content to the other programmable controller only when a reply indicating that the circuit corresponding to the first circuit is included is received from the other programmable controller.

According to the programmable controller of the above-described first aspect, when the sequence-program correcting unit corrects the sequence program, the corrected-information obtaining unit obtains the corrected portion and the corrected content of the corrected sequence program, and the corresponding-circuit inquiring unit extracts the first circuit in the vicinity of the corrected portion from the sequence program before correction and makes an inquiry to another programmable controller about whether to have a sequence program including a circuit corresponding to the first circuit. Then, the corrected-content transmitting unit transmits the corrected content only to the other programmable controller that has replied that a circuit corresponding to the first circuit is included, as a result of the inquiry.

Accordingly, the corrected content of the sequence program can be automatically transmitted to the programmable controller that has a circuit corresponding to the first circuit. As a result, when the sequence program is corrected, it is not necessary to individually correct the sequence programs of the plurality of programmable controllers connected via the communication network, thus making it possible to achieve a reduction in the time to correct the sequence programs and to improve the maintainability of the entire system including the plurality of programmable controllers.

In the programmable controller according to the above-described first aspect, the control unit may further include: a corresponding-circuit searching unit that receives, from the other programmable controller, an inquiry about whether a second circuit that is included in the sequence program of the other programmable controller is included in the sequence program, that searches the sequence program for a circuit corresponding to the second circuit, and that replies, to the other programmable controller, about whether the circuit corresponding to the second circuit is included in the sequence program; and a sequence-program updating unit that receives the corrected content from the other programmable controller and that updates the circuit corresponding to the second circuit on the basis of the corrected content.

According to this configuration, the corresponding-circuit searching unit searches the sequence program for a circuit corresponding to the second circuit and replies to the other programmable controller about whether the circuit corresponding to the second circuit is included in the sequence program. Then, when the corresponding circuit is included in the sequence program, the sequence-program updating unit performs updating on the basis of the corrected content received from the other programmable controller.

Accordingly, since the circuit corresponding to the second circuit by the other programmable controller is automatically updated, it is possible to reduce the time to correct the sequence programs and to improve the maintainability of the entire system including the plurality of programmable controllers.

According to a second aspect, the present invention provides a system that is provided with the above-described plurality of programmable controllers interconnected via the communication network and that corrects sequence programs.

According to a third aspect, the present invention provides a programmable controller that can be connected to another programmable controller and to a controller that controls the programmable controllers, via a communication network, including: a storage unit that stores a sequence program; and a control unit, wherein the control unit includes: a sequence-program correcting unit that corrects the sequence program; a corrected-information obtaining unit that obtains a corrected portion and a corrected content from the corrected sequence program; a corresponding-circuit inquiring unit that extracts a circuit in the vicinity of the corrected portion from the sequence program before correction and that makes an inquiry to the controller about whether a circuit corresponding to the circuit is included in a sequence program of the other programmable controller; and a corrected-content transmitting unit that transmits, in response to the inquiry from the corresponding-circuit inquiring unit, the corrected content to the other programmable controller only when a reply indicating that the circuit corresponding to the circuit is included is received from the controller.

According to the programmable controller of the above-described third aspect, when the sequence-program correcting unit corrects the sequence program, the corrected-information obtaining unit obtains the corrected portion and the corrected content of the corrected sequence program, and the corresponding-circuit inquiring unit extracts the first circuit in the vicinity of the corrected portion from the sequence program before correction and makes an inquiry to the controller, which controls the programmable controllers, about whether the other programmable controller has a sequence program including a circuit corresponding to the first circuit. Then, the corrected-content transmitting unit transmits the corrected content only to the other programmable controller that has replied that the circuit corresponding to the first circuit is included, as a result of the inquiry.

Accordingly, the corrected content of the sequence program can be automatically transmitted to the programmable controller that has a circuit corresponding to the first circuit. As a result, when the sequence program is corrected, it is not necessary to individually correct the sequence programs of the plurality of programmable controllers connected via the communication network, thus making it possible to reduce the time to correct the sequence programs and to improve the maintainability of the entire system including the plurality of programmable controllers.

In the programmable controller according to the above-described third aspect, the control unit may further include: a sequence-program transmitting unit that transmits, in response to a request from the controller, a copy of the sequence program to the controller; and a sequence-program updating unit that receives the corrected content from the other programmable controller and that updates the sequence program on the basis of the corrected content.

According to this configuration, because it is possible to reduce the amounts of processing performed in the programmable controllers, compared with the programmable controllers according to the above-described first aspect, it is possible to suppress the loads of the CPUs of the programmable controllers.

According to a fourth aspect, the present invention provides a system that corrects sequence programs, including: the above-described plurality of programmable controllers interconnected via the communication network; and a controller that is connected to the programmable controllers via the communication network and that controls the programmable controllers, wherein the controller includes: a sequence-program requesting unit that receives the inquiry from one programmable controller of the programmable controllers and that requests the other programmable controller to transmit a copy of the sequence program; and a response unit that searches the copy of the sequence program for a circuit corresponding to the circuit and that replies, to the one programmable controller and the other programmable controller, about whether the circuit corresponding to the circuit is included in the copy of the sequence program.

According to the present invention, an advantageous effect is afforded in that it is possible to reduce the time to correct the sequence programs and to improve the maintainability of the system including programmable controllers.

The invention claimed is:

1. A programmable controller connected to another programmable controller via a communication network, comprising:
   a storage unit that stores a sequence program; and
   a control unit,
   wherein the control unit comprises:
   a sequence-program correcting unit that corrects the sequence program;
   a corrected-information obtaining unit that obtains a corrected portion and corrected content from the corrected sequence program;
   a corresponding-circuit inquiring unit that extracts a first circuit in a vicinity of the corrected portion from the sequence program before correction and that makes an inquiry to the other programmable controller about whether a circuit corresponding to the first circuit is included in a sequence program of the other programmable controller; and
   a corrected-content transmitting unit that transmits, in response to the inquiry from the corresponding-circuit inquiring unit, the corrected content to the other programmable controller only when a reply is received from the other programmable controller indicating that the circuit corresponding to the first circuit is included in the sequence program of the other programmable controller,
   wherein the control unit further comprises
      a corresponding-circuit searching unit that receives, from the other programmable controller, an inquiry about whether a circuit that corresponds to a second circuit, which is included in the sequence program of the other programmable controller, is included in the sequence program of the storage unit, that searches the sequence program of the storage unit for the circuit corresponding to the second circuit, and that replies, to the other programmable controller, about whether the circuit corresponding to the second circuit is included in the sequence program, and
      a sequence-program updating unit that receives corrected content from the other programmable controller and that updates the sequence program of the storage unit on the basis of the corrected content.

2. A system that is provided with a plurality of programmable controllers according to claim 1, interconnected via the communication network, that corrects sequence programs.

3. A programmable controller connected to another programmable controller and to a controller that controls the programmable controllers, via a communication network, comprising:
   a storage unit that stores a sequence program; and
   a control unit,
   wherein the control unit comprises:
   a sequence-program correcting unit that corrects the sequence program;
   a corrected-information obtaining unit that obtains a corrected portion and a corrected content from the corrected sequence program;
   a corresponding-circuit inquiring unit that extracts a circuit in a vicinity of the corrected portion from the sequence program before correction and that makes an inquiry to the controller about whether another circuit corresponding to the circuit is included in a sequence program of the other programmable controller; and
   a corrected-content transmitting unit that transmits, in response to the inquiry from the corresponding-circuit inquiring unit, the corrected content to the other programmable controller only when a reply is received from the controller indicating that the other circuit corresponding to the circuit is included in the sequence program of the other programmable controller,
   wherein the control unit further comprises
      a sequence-program transmitting unit that transmits, in response to a request from the controller, a copy of the sequence program to the controller, and
      a sequence-program updating unit that receives the corrected content from the other programmable controller and that updates the sequence program on the basis of the corrected content.

4. A system that corrects sequence programs, comprising:
   a plurality of programmable controllers according to claim 3 that are interconnected via the communication network;
   wherein the controller that is connected to the programmable controllers via the communication network controls the programmable controllers, and
   wherein the controller comprises:
   a sequence-program requesting unit that receives the inquiry from one programmable controller of the programmable controllers and that requests the other programmable controller to transmit a copy of the sequence program; and
   a response unit that searches the copy of the sequence program for the other circuit corresponding to the circuit and that replies, to the one programmable controller and the other programmable controller, about whether the other circuit corresponding to the circuit is included in the copy of the sequence program.

5. A system for automatically updating a programmable circuit in a second programmable controller connected, via a communication network, to a first programmable controller, comprising:
   a first memory associated with the first programmable controller, wherein the first memory stores a first sequence program comprising a first circuit; and
   a controller, comprising
      a sequence-program correcting processor to replace the first circuit with a corrected content, creating a first corrected sequence program;

a corrected-information obtaining processor to obtain the corrected content from the sequence-program correcting processor;
a corresponding-circuit inquiring processor
to extract the first circuit from the first sequence program,
to inquire of the second programmable controller if a second sequence program includes a circuit corresponding to the first circuit, and
to generate an inquiry;
a corrected-content transmitting processor to transmit, in response to the inquiry from the corresponding-circuit inquiring processor, the corrected content to the second programmable controller only when the second programmable controller transmits an indication that the circuit corresponding to the first circuit is included in the second sequence program;
a corresponding-circuit searching processor to determine if the second sequence program includes the circuit corresponding to the first circuit and to transmit the indication to the corrected-content transmitting processor; and
a sequence-program updating processor to receive the corrected content from the corrected-content transmitting processor and to modify the programmable circuit using the corrected content to create a second corrected sequence program.

6. The system according to claim 5, wherein, in response to receipt of the inquiry, the corresponding-circuit searching processor searches the second sequence program for the circuit corresponding to the first circuit before transmitting the indication.

7. The system according to claim 6, further comprising a plurality of programmable controllers, connected to the first programmable controller and the second programmable controller via the communication network, wherein the programmable circuit in each of the plurality of programmable controllers is modifiable using the corrected content.

8. A system for automatically updating a programmable circuit in a second programmable controller connected, via a communication network, to a first programmable controller, comprising:
a controller connected, via the communication network, to the first programmable controller and the second programmable controller to control the first programmable controller and the second programmable controller;
a first memory associated with the first programmable controller, wherein the first memory stores a first sequence program comprising a first circuit;
a second memory associated with the second programmable controller, wherein the second memory stores a second sequence program comprising the programmable circuit; and
a further controller, comprising
a sequence-program correcting processor to correct the first circuit with a corrected content, creating a first corrected sequence program;
a corrected-information obtaining processor to obtain the corrected content from the sequence-program correcting processor;
a corresponding-circuit inquiring processor
to extract the first circuit from the first sequence program,
to inquire of the controller if the second sequence program includes a circuit corresponding to the first circuit, and
to generate an inquiry;
a corrected-content transmitting processor to transmit, in response to the inquiry from the corresponding-circuit inquiring processor, the corrected content to the second programmable controller only when the controller transmits an indication that the circuit corresponding to the first circuit is included in the second sequence program;
a corresponding-circuit searching processor to determine if the second sequence program includes the circuit corresponding to the first circuit and to transmit the indication to the corrected-content transmitting processor; and
a sequence-program updating processor to receive the corrected content from the corrected-content transmitting processor and to modify the programmable circuit using the corrected content to create a second corrected sequence program.

9. The system according to claim 8, wherein the further controller further comprises:
a sequence-program transmitting processor that transmits, in response to a request from the controller, a copy of the first sequence program to the controller.

10. The system according to claim 8, wherein the controller comprises:
a sequence-program requesting processor that receives the inquiry; and
a response processor that searches for the circuit corresponding to the first circuit and that replies, to the first programmable controller, about whether the circuit corresponding to the first circuit is included in the second sequence program.

11. The system according to claim 8, further comprising a plurality of programmable controllers connected to the first programmable controller and the second programmable controller via the communication network to modify respective programmable circuits using the corrected content.

* * * * *